United States Patent [19]
Reed et al.

[11] Patent Number: 5,848,081
[45] Date of Patent: Dec. 8, 1998

[54] INSULATED WATER COOLED GAIN MEDIUM ASSEMBLY FOR A LASER SYSTEM

[75] Inventors: Edward D. Reed, Sunnyvale; James Hobart, Los Altos Hills, both of Calif.

[73] Assignee: Coherent, Inc., Santa Clara, Calif.

[21] Appl. No.: 904,216

[22] Filed: Jul. 31, 1997

[51] Int. Cl.$^6$ ........................................ H01S 3/04
[52] U.S. Cl. ................................. 372/35; 372/34
[58] Field of Search .................... 372/34, 35, 70

[56] References Cited

U.S. PATENT DOCUMENTS

| | | | |
|---|---|---|---|
| 4,707,837 | 11/1987 | Bennett et al. | 372/34 |
| 5,222,073 | 6/1993 | Epstein et al. | 372/34 |
| 5,327,442 | 7/1994 | Yarborough et al. | 372/35 |
| 5,502,740 | 3/1996 | Welsch et al. | 372/34 |

*Primary Examiner*—Hemang Sanghavi
*Attorney, Agent, or Firm*—Limbach & Limbach L.L.P.

[57] ABSTRACT

A gain medium assembly for a laser system that has or attaches to a cooling fluid source. The gain medium assembly includes a laser system gain medium, an insulating jacket disposed around the gain medium, a cooling jacket disposed around the insulating jacket, and an energy source for optically exciting and heating the gain medium. The cooling jacket defines a cooling channel between itself and the insulating jacket for guiding flowing cooling fluid from the cooling fluid source over the insulating jacket. During operation, the heat in the gain medium dissipates through the insulating jacket and to the cooling fluid in the cooling channel, while the gain medium is maintained at a temperature that is significantly higher than the temperature of the cooling fluid. A gap may be formed between the gain medium and the insulating jacket to allow some of the cooling water to fill the gap and form a thin layer of water, and to provide uniform heat conduction, between the gain medium and the insulating jacket.

24 Claims, 6 Drawing Sheets

INSULATED WATER COOLED GAIN MEDIUM ASSEMBLY FOR A LASER SYSTEM

FIELD OF THE INVENTION

The present invention relates to laser systems, and more particularly to water cooled gain medium assemblies.

BACKGROUND OF THE INVENTION

It is known to use a water cooled gain medium in a laser system to generate a high power optical output. An external energy source, such as a flash lamp, is disposed adjacent to the gain medium to optically excite the gain medium. A laser resonator is formed whereby a pulsed or continuous wave intracavity laser beam is generated and amplified by the excited gain medium. A portion of the intracavity laser beam is coupled out of the laser resonator to form the laser system optical output. For high power laser systems, the excited portion of the gain medium, and the flashlamp, are cooled with a flowing cooling fluid (such as water) to remove waste heat generated by the flash lamp and deposited in the gain medium.

Most gain mediums exhibit optimal performance when cooled with relatively low temperature cooling water (i.e. room temperature or less). The source of the cooling water can simply be running tap water, or more typically a complex closed loop heat exchange system that circulates cooling water while maintaining the temperature of the cooling water in the system near or below room temperature. Other components can also be water cooled using the same source of cooling water, such as the flash lamp, high power electronics, other laser cavity components, etc.

However, some gain media, such as Alexandrite, exhibit a laser gain coefficient that increases with temperature. Therefore, operating with cooling water that is significantly hotter than room temperature, for example 70° C., results in superior performance and efficiency. Further, elevated gain medium temperatures result in shorter pulse lengths when the laser is Q-switched. The superior efficiency results in higher output powers at lower flashlamp currents, which increases the lifetime of the flashlamp.

There are several drawbacks to cooling a laser gain medium with high temperature cooling water. First, tap water is not a feasible source for the high temperature cooling water. Instead, a closed loop cooling system or its equivalent must be used that couples heat out of the cooling system only when the cooling water reaches its desired high operating temperature. Second, since most cooling systems do not include heating elements except for the laser itself, laser system warm up times can exceed 30 minutes or more. During warm up, heat from the lamp eventually raises the cooling water temperature to the desired high operating temperature. Third, other water-cooled components in the laser system that require low temperature cooling water cannot be cooled with water from the high temperature cooling system. A second, low temperature, cooling water source must be added to cool these components, which adds cost and complexity to the laser system.

There is a need for a cooling system for a laser system that uses a low temperature cooling fluid to cool a gain medium operated at a temperature significantly higher than that of the cooling fluid. This laser system should ideally use cooling fluid near room temperature so that it has a short warm up time. The cooling system should also be capable of cooling other components of the laser system.

SUMMARY OF THE INVENTION

The present invention solves the aforementioned problems by providing a gain medium assembly that partially insulates the gain medium from the cooling fluid so that the gain medium operates at a temperature that is significantly higher than the cooling fluid.

The gain medium assembly of the present invention, which is for a laser system that is connectable to a cooling fluid source, includes a gain medium, an insulating jacket disposed around the gain medium, a cooling jacket disposed around the insulating jacket, and an energy source for optically exciting and heating the gain medium. The cooling jacket defines a cooling channel between itself and the insulating jacket for guiding flowing cooling fluid from the cooling fluid source over the insulating jacket. During operation, the heat in the gain medium dissipates through the insulating jacket and to the cooling fluid in the cooling channel, while the gain medium is maintained at a temperature that is significantly higher than the temperature of the cooling fluid.

Other objects and features of the present invention will become apparent by a review of the specification, claims and appended figures.

DETAILED DESCRIPTION OF THE PREFERRED EMBODIMENTS

The present invention is a fluid cooled gain medium assembly for a laser system, where the gain medium operates at a temperature significantly greater than the temperature of the cooling fluid.

Figure 1:
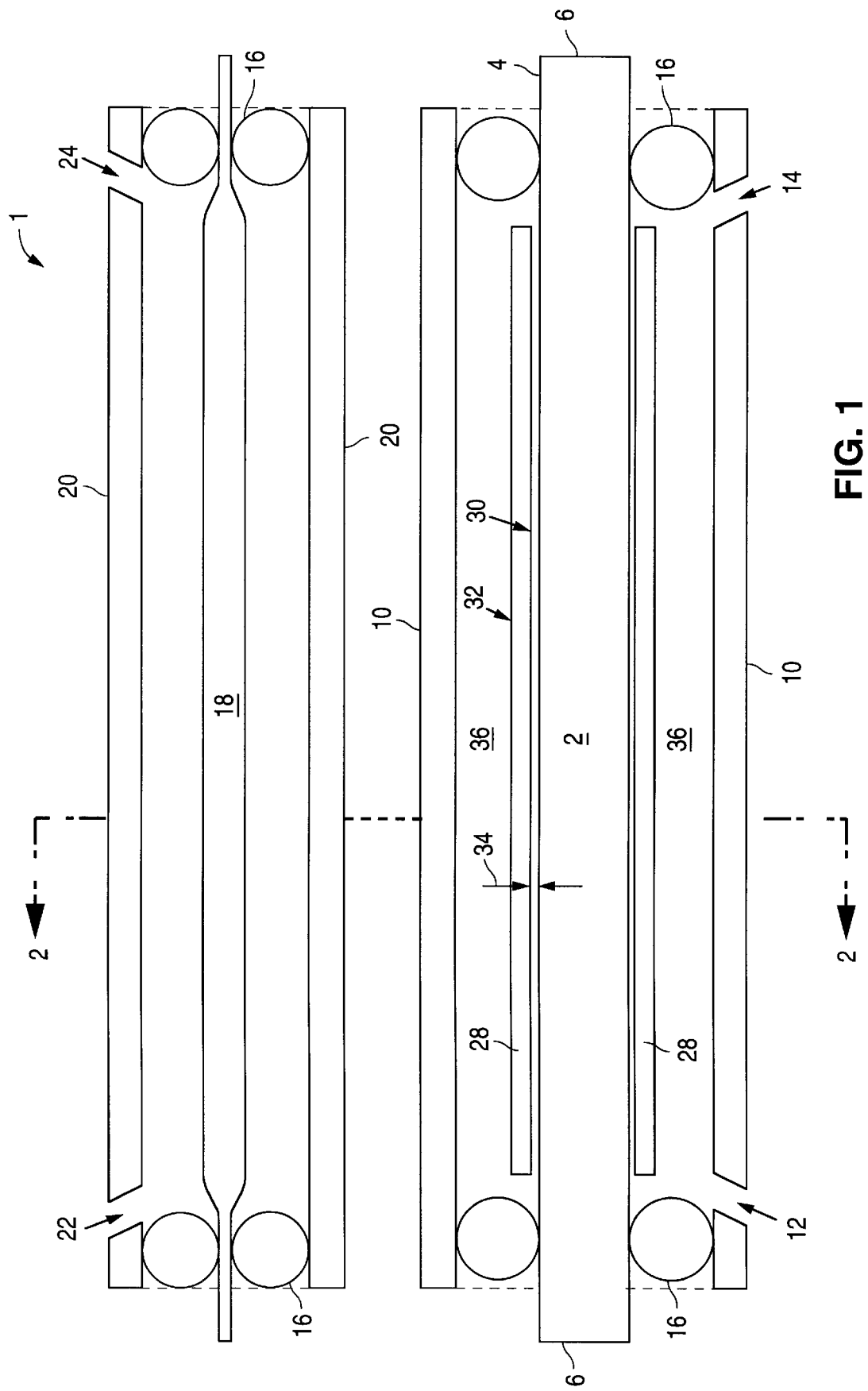
FIG. 1 is a side cross-sectional view of the gain medium assembly of the present invention.
Figure 2:
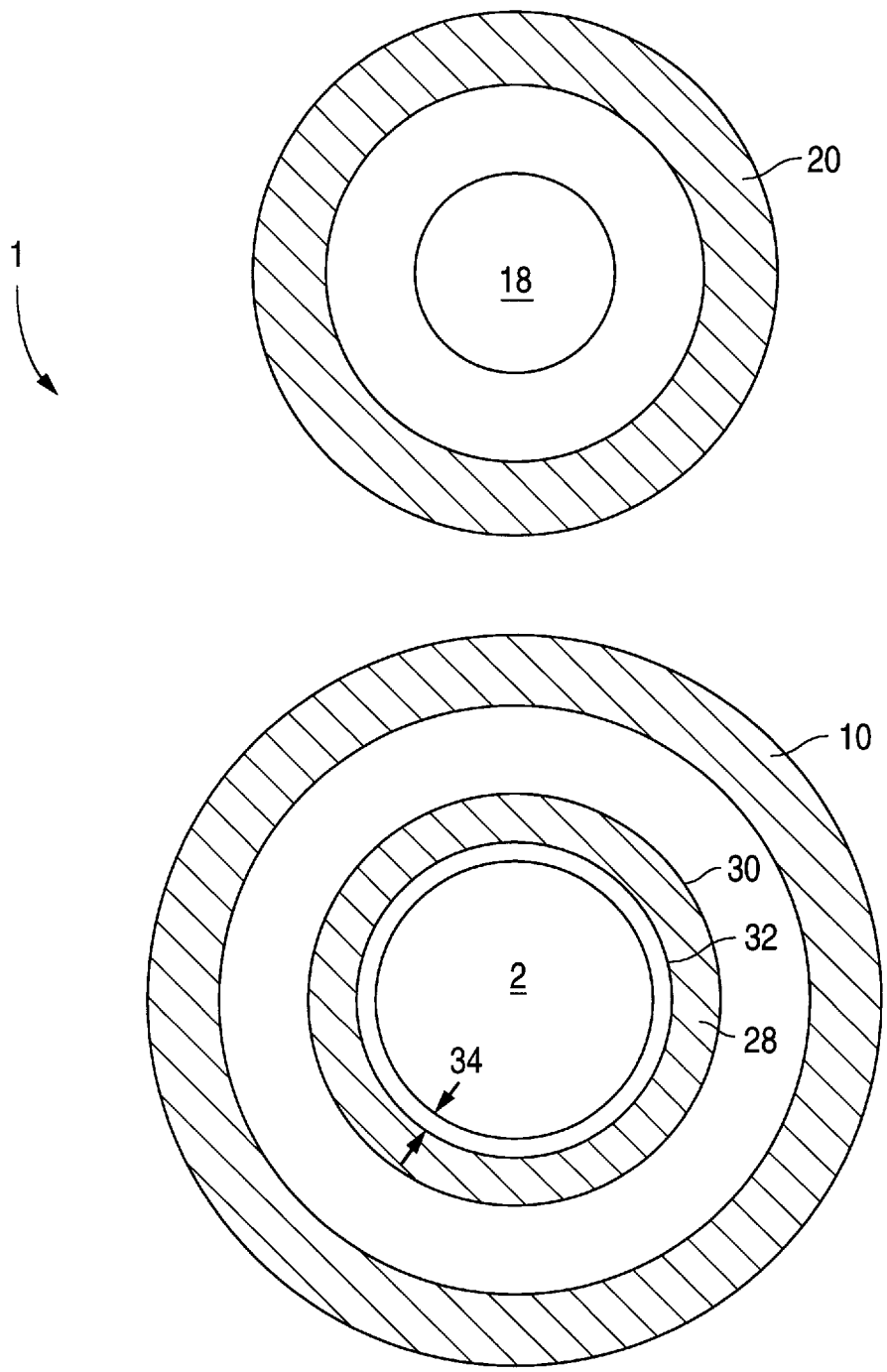
FIG. 2 is an end cross-sectional view of the gain medium assembly of the present invention.
Figure 3:
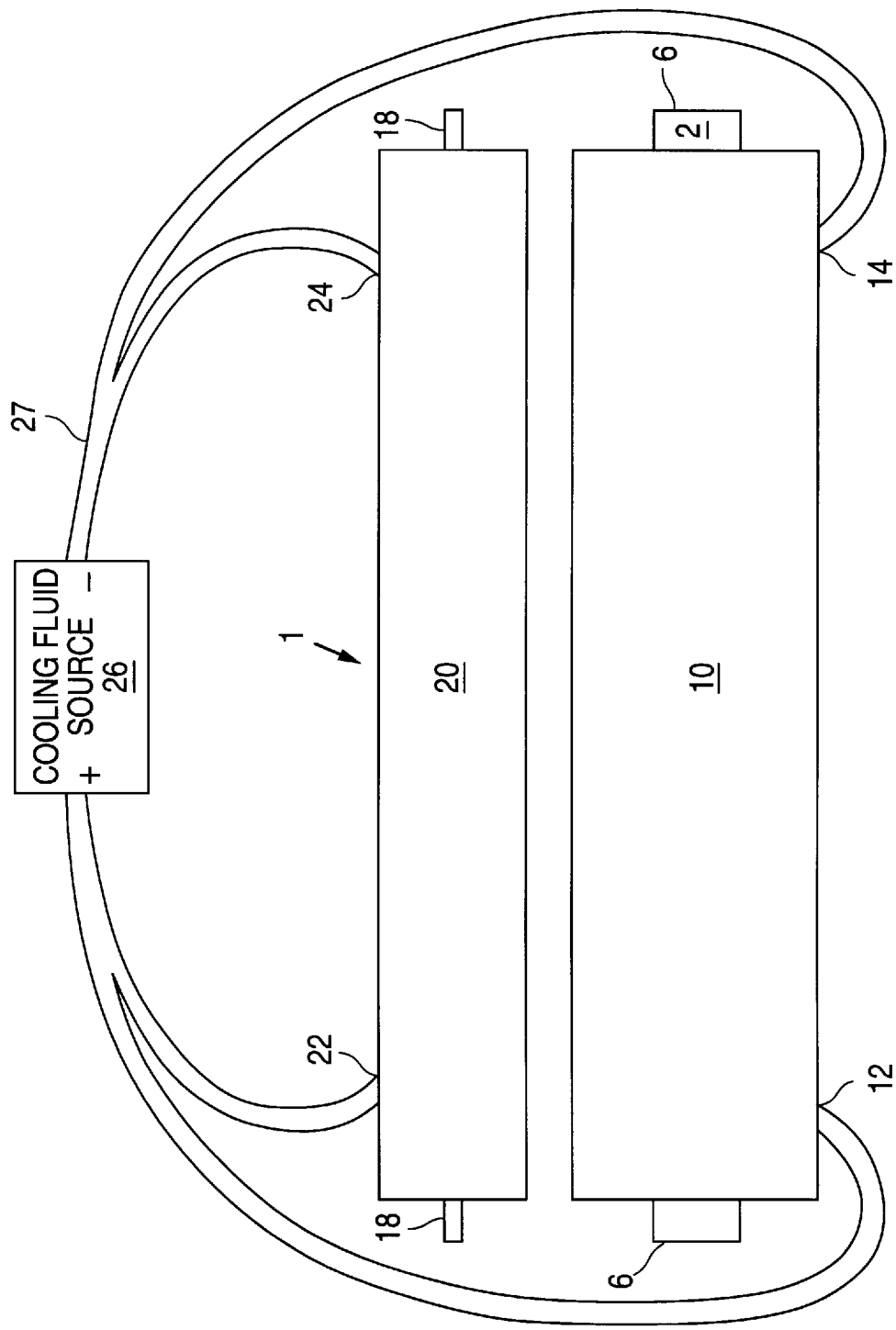
FIG. 3 is a side view illustrating the connection of the cooling jackets with the cooling fluid source.

A gain medium assembly 1 of the present invention is illustrated in FIGS. 1–3, and includes a cylindrically shaped laser gain medium (laser rod) 2 having an outer side surface 4 and opposing end faces 6. The laser rod 2 is disposed inside a cooling jacket 10. The cooling jacket 10 has a fluid input port 12 and output port 14 for circulating cooling fluid, such as water, along the length of the laser rod 2. O-rings 16 at each end of the cooling jacket 10 form a seal between the cooling jacket 10 and rod 2 to prevent cooling fluid from leaking out onto the end faces 6.

One or more lamp sources 18 are disposed adjacent the side surface 4 to optically excite laser rod 2, which generates an intracavity beam that oscillates in a laser cavity (not shown). The lamp source 18 is disposed inside a second cooling jacket 20 having cooling fluid input and output ports 22 and 24 for circulating cooling fluid along the length of the lamp 18. O-rings 16 at each end of the cooling jacket 20 form a seal between the jacket 20 and lamp 18 to prevent cooling fluid from leaking out onto the ends of the lamp 18.

Cooling jackets 10 and 20 are made of a material, such as pyrex or fused silica, that is transparent to the optical energy produced by lamp 18. The optical energy from lamp 18 passes through cooling jackets 20 and 10, and the cooling fluid circulating therein, to optically excite rod 2.

Input ports 12/22, and output ports 14/24 are connected by cooling lines 27 to an cooling fluid source 26, such as a water tap and drain, a water to water heat exchanger, or a water to air heat exchanger. During operation, cooling fluid (preferably water) is supplied to input ports 12/22 and flows through cooling jackets 10/20 to cool the laser rod 2 and lamp 18. The cooling fluid exits jackets 10/20 through output ports 14/24.

An insulating jacket (tube) 28 with an inner surface 30 and an outer surface 32 is disposed inside the cooling jacket 10 and around the gain medium outer surface 4, whereby a cooling channel 36 is formed between the cooling jacket 10 and the insulating jacket outer surface 32. The insulating tube 28 is made of a material, such as pyrex or fused silica, that is transparent to the optical output of the lamp 18. A small gap 34 is formed between the gain medium outer surface 4 and the insulating tube inner surface 30. The thickness of the gap 34 is just large enough so that the cooling water flowing through cooling channel 36 enters and fills gap 34, thus forming a static thin layer of water between the gain medium outer surface 4 and insulating jacket inner surface 30. The thin layer of water provides uniform and efficient heat conduction between the laser rod 2 and insulating tube 28. For best results, the gap thickness is limited in size to divert most of the fluid flow through cooling channel 36, and to prevent any significant water flow through gap 34 that would carry heat directly away from the laser rod 2 without first traversing through insulating tube 28.

During operation, the optical output from lamp 18 excites and heats laser rod 2. The waste heat deposited in laser rod 2 dissipates out through laser rod outer surface 4, through the thin layer of water in gap 34, across insulation tube 28 (from inner surface 30 to outer surface 32), and out of cooling jacket 10 via the flowing cooling fluid in cooling channel 36.

A temperature gradient is created during operation across insulating tube 28, between inner surface 30 and outer surface 32. Therefore, the insulating tube outer surface 32, which is in contact with the cooling water, is cooler than the insulating tube inner surface 30, which is in thermal contact with the laser rod 2 via the layer of water in gap 34. This allows the laser rod 2 to operate at a temperature that is significantly higher than the temperature of the cooling water. The temperature difference, and therefore the operating temperature of the gain medium, is increased by increasing the thickness of the insulating tube 28. However, it is preferable not to have the operating temperature of the gain medium be high enough to allow the cooling water in the gap 34 to boil.

Figure 4:
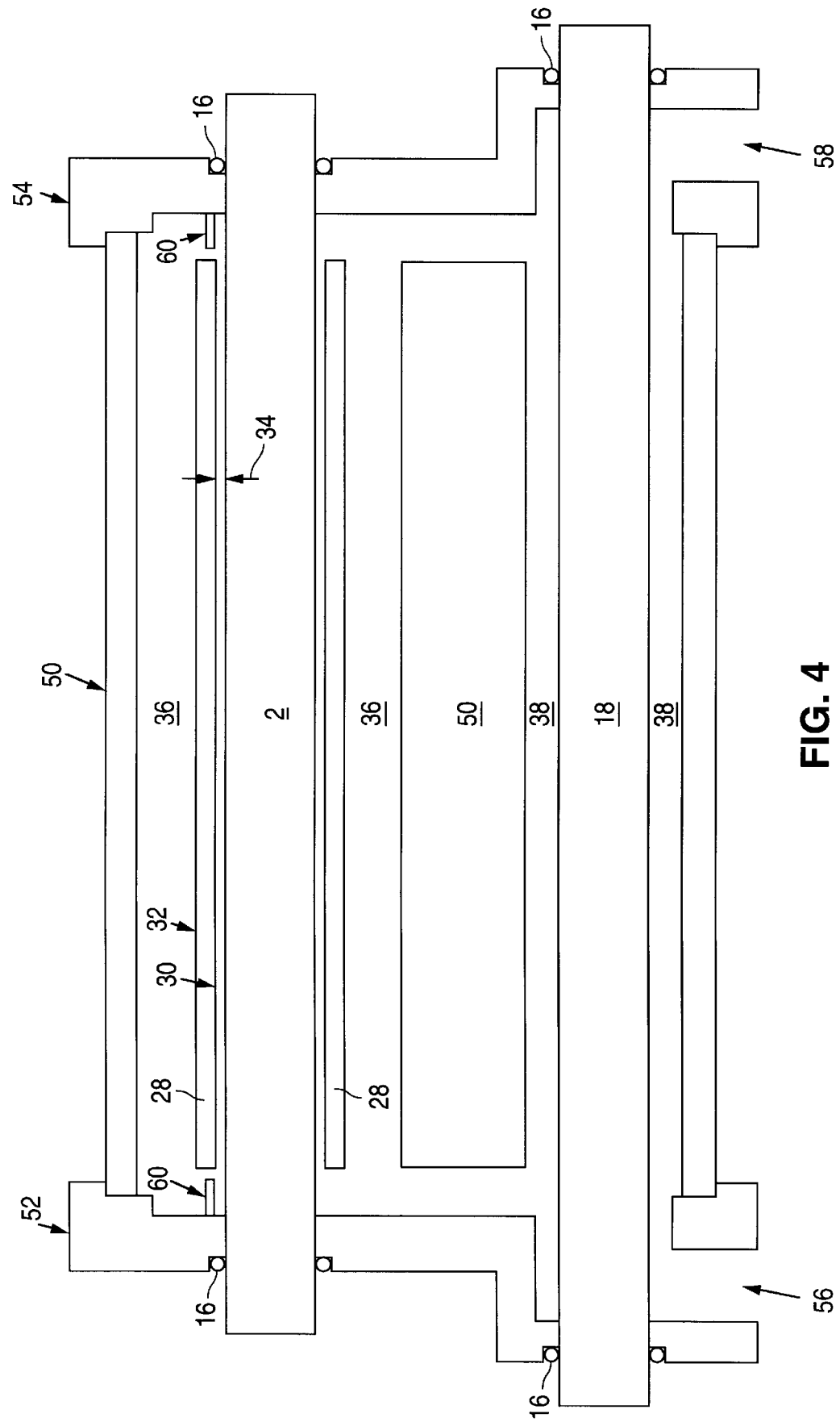
FIG. 4 is a side cross-sectional view of the composite cooling jacket of the present invention.
Figure 5:
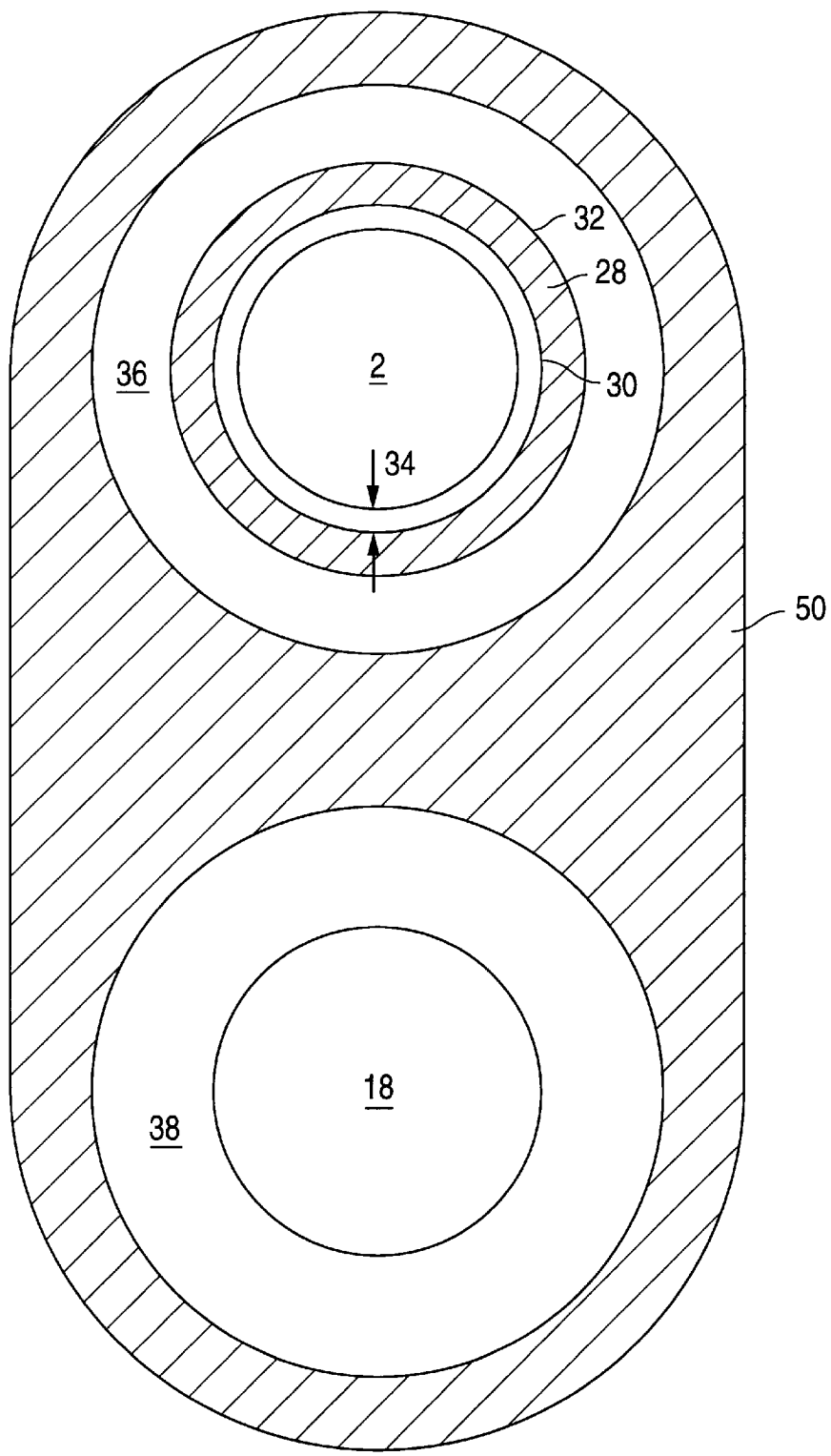
FIG. 5 is an end cross-sectional view of the composite cooling jacket of the present invention.

The present inventors have developed a unitary water cooled gain medium assembly 1 for an Alexandrite laser system, as illustrated in FIGS. 4–5. The gain medium assembly 1 includes a single jacket 50 made of fused silica, which contains two cooling channels 36 and 38. An Alexandrite laser rod 2 is inserted within cooling channel 36, and an 600 watt xenon lamp 18 is inserted within cooling channel 38. The Alexandrite rod 2 has an outer diameter of about 0.1572 inches and a length of about 3.74 inches.

A pyrex glass insulating tube 28 is disposed around the Alexandrite rod 2 forming gap 34 therebetween. The insulating tube 28 inner surface 30 has a diameter of about 0.1580 inches, +/−0.0002 inches, the outer surface 32 has an outer diameter of about 0.2180 inches, and the insulating tube 28 has a length of about 2.75 inches. It has been determined that the thickness of gap 34 is ideally about 0.0005 inches, which results in gap 34 filling up with the cooling water without causing excessive water flow through gap 34. However, as illustrated below, a gap thickness of as high as 0.001 inches is tolerable.

Assuming that the cooling fluid source generates a 60 psi difference between input port 22 and output port 24 (for cooling water flow through cooling jacket 50 at a rate of about 2 gallons per minute), and assuming a temperature rise of the cooling water is 10° C. over the length of tube 28, one can calculate the following results for various values of gap thickness:

| Gap Thickness (inches) | Flow through Gap (ml/s) | Heat removable by Gap Flow (Watts) |
| --- | --- | --- |
| 0.0005 | 0.05 | 2.0 |
| 0.001 | 0.38 | 16 |
| 0.002 | 3.2 | 135 |

Since approximately 60 watts of heat are generated in the gain medium 2, using a gap thickness of 0.002 inches results in substantially all the heat in gain medium 2 being removed by the 3.2 ml of water per second flowing through the gap 34. In such a case, use of the insulating tube 28 does not cause a rise in the operating temperature of the gain medium 2. However, by limiting the gap thickness to 0.001 inches or less, only a relatively small amount of the gain medium heat is removed by the water flowing through the gap 34. A majority of the approximately 60 watts of heat generated in the gain medium is removed only after first passing through that water film and then through insulating tube 28, which results in a rise in the gain medium operating temperature. A gap thickness of 0.0005 is ideal because a flow rate of 0.05 ml/second means that gap 34 will fill with cooling water, but the water in gap 34 is essentially static. The essentially static cooling water in gap 34 provides good even conduction between the gain medium 2 and the insulating tube 28, while preventing significant heat removal by water flowing through gap 34.

A pair of end plates 52 and 54 attach to the ends of cooling jacket 50. The ends of rod 2 and lamp 18 extend through apertures in the end plate 52/54, which are sealed using O-ring seals 16. A sealing agent or additional O-rings can be used to form a seal between cooling jacket 50 and plates 52/54. The plates 52/54 can be held in place by clamps or rods that extend therebetween. A single cooling fluid input port 56 is formed in plate 52 for feeding cooling fluid to both cooling channels 36/38, which drain through an output port 58 formed in plate 54. Positioning pins 60 can be added that protrude from plates 52/54 to engage with insulating tube 28 for maintaining a centered position of tube 28 with respect to plates 52/54.

By utilizing the insulating tube 28 of the present invention around the gain medium, the Alexandrite rod 2 operates at a significantly higher temperature even though the cooling water is near room temperature (about 20°–30° C). It is estimated that cooling the above described Alexandrite gain medium without using the insulating tube 28 results in the gain medium operating at a temperature of about 5° C. or less above the temperature of the cooling water. However, with the insulating tube 28 of present invention forming a gap 34 with a 0.0005 inch thickness, it is estimated that the gain medium operates at a temperature of at least 30°–40° C. above the temperature of the cooling water. The elevated temperature of the Alexandrite rod 2 results in a Q-switched output power of 7 watts of continuous power, with 0.7 joule pulses having a 40 ns pulse length at 10 Hz. The warm up time for this system is about 10 seconds because the cooling water from the cooling fluid source 26 is maintained at about room temperature. Without the insulating tube 28, the above mentioned Alexandrite laser system produces about half the output power with much longer pulse lengths (almost double) than the 40 ns pulse lengths achievable with a system using the insulating tube 28.

Figure 6:
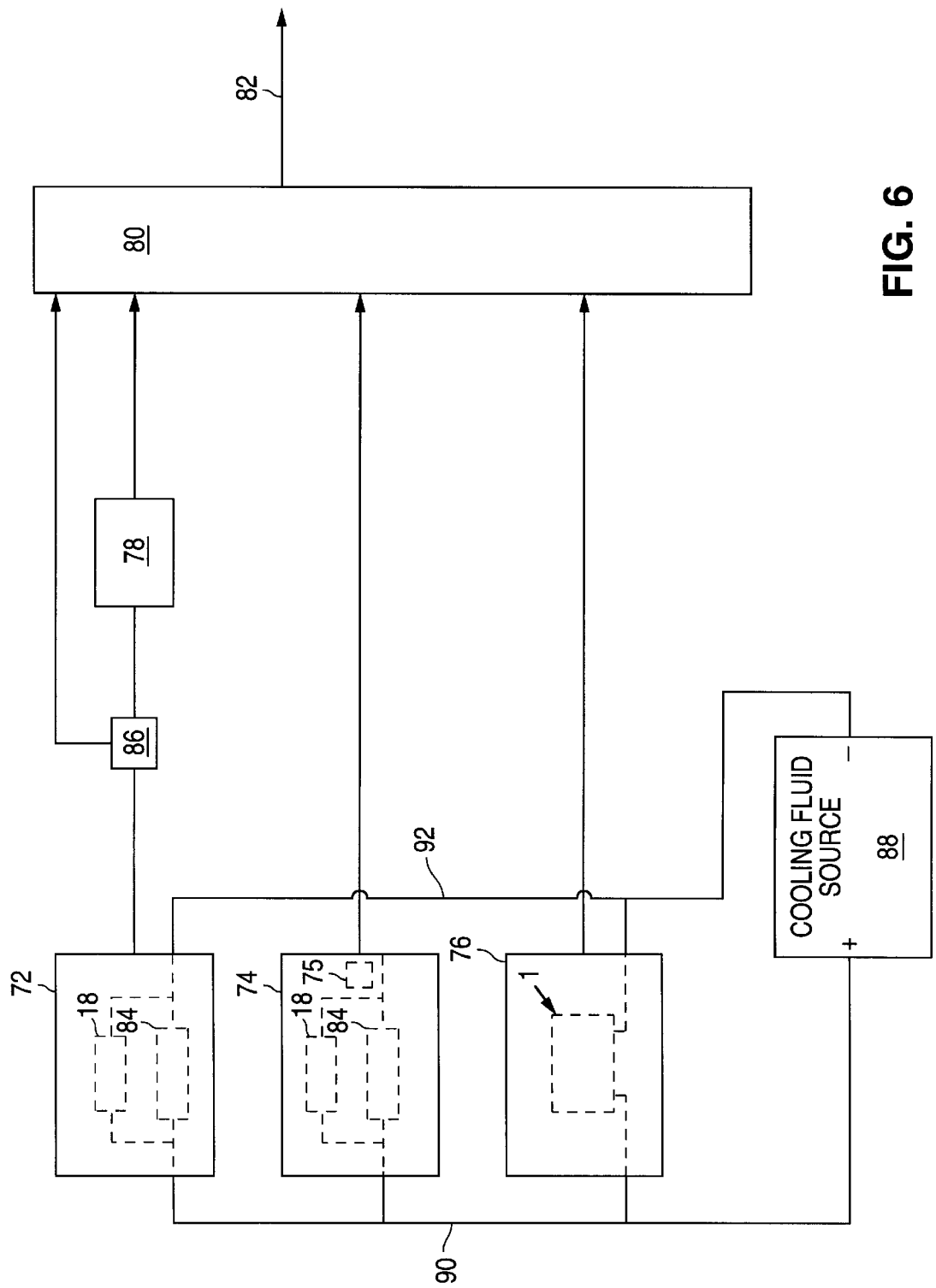
FIG. 6 is a plan view of a multi-cavity laser system using the gain medium assembly of the present invention.

The water cooled gain medium assembly 1 is ideal for composite laser systems that have multiple laser cavities with multiple gain media. For example, the composite laser system illustrated in FIG. 6, which has been developed by the current assignee, includes three laser cavities 72, 74, and 76, with an external doubling crystal 78, and a combining means 80 for combining the separate beams from the cavities 72/74/76 into a single laser system output beam 82.

Cavity 72 is a Q-switched Nd:YAG laser cavity that includes both a flashlamp 18 and an Nd:YAG gain medium 84, both of which require water cooling. Cavity 74 is an intra-cavity doubled Nd:YAG laser cavity using a KTP doubling crystal 75 therein. Cavity 74 includes a flashlamp 18 and Nd:YAG gain medium 84, both of which require water cooling. Cavity 76 is a Q-switched Alexandrite laser cavity that includes the gain medium assembly 1 illustrated in FIGS. 4–5.

A selection device 86 is mounted to intercept the output of the cavity 72 and alternately direct the output beam directly to the combining means 80, or to the external doubling crystal 78. This composite laser system is therefore capable of four different possible unique output beams. These unique beams are combined by the combining means 80 to form a single output beam 82. The combining means 80 can be rotating mirrors or a prism, that capture a given unique beam and reflect that beam out as the output beam 82.

The laser cavities 72/74/76 are all supplied with cooling water from a single cooling water source 88 via supply lines 90 and return lines 92. The Nd:YAG gain media 84 and flashlamps 18 in laser cavities 72 and 74, and the flashlamp 18 in cavity 76, are directly cooled with the low temperature cooling water. Cavity 76 utilizes the gain medium assembly 1, with the insulating jacket 28 of the present invention (as illustrated in FIGS. 4–5), for operating the Alexandrite gain medium at a temperature significantly greater than that of the cooling water.

It is to be understood that the present invention is not limited to the embodiments described above and illustrated herein, but encompasses any and all variations falling within the scope of the appended claims. For example, the gain medium 2, insulating jacket 28, lamp 18 and/or cooling jackets 10/20 need not be cylindrically shaped. Further, the insulating jacket of the present invention can be used on any laser gain medium, not just Alexandrite, to elevate the operating temperature of the gain medium. In addition, the excitation source could be other sources of optical energy, such as lasers or laser diodes, which optically pump the gain medium through a side or end surface of the gain medium. Moreover, the insulating jacket could be permanently or temporarily attached to the gain medium, such as with glue, with or without incorporating a gap and water layer therebetween. Finally, the thin layer of water in the gap could be permanently sealed therein.

What is claimed is:

1. A gain medium assembly for a laser system connectable to a cooling fluid source, comprising:

a gain medium;

an insulating jacket disposed around the gain medium;

a cooling jacket disposed around the insulating jacket to define a cooling channel therebetween for guiding flowing cooling fluid from the cooling fluid source over the insulating jacket; and an energy source for optically exciting and heating the gain medium, wherein the heat in the gain medium dissipates through the insulating jacket and to the cooling fluid in the cooling channel, and wherein the gain medium is maintained at a temperature that is significantly higher than the temperature of the cooling fluid.

2. The gain medium assembly of claim 1, wherein an outer surface of the gain medium forms a gap with an inner surface of the insulating jacket to trap substantially static cooling fluid therein.

3. The gain medium assembly of claim 1, wherein during operation the gain medium is maintained at a temperature that is at least 30° C. higher than the temperature of the cooling fluid.

4. The gain medium assembly of claim 1, wherein an outer surface of the gain medium forms a gap with an inner surface of the insulating jacket, the gap having a width that is small enough to divert most of the flowing cooling water to the cooling channel while allowing some of the cooling fluid in the cooling channel to fill the gap and form a layer of cooling fluid between the gain medium and the insulating jacket for even thermal contact therebetween.

5. The gain medium assembly of claim 4, wherein the energy source is a flashlamp disposed adjacent to the cooling jacket for optically exciting the gain medium, the insulating jacket and the cooling jacket are made of materials that are transparent to the optical output of the flashlamp.

6. The gain medium assembly of claim 5, further comprising:

a second cooling jacket surrounding the flashlamp for guiding flowing cooling fluid from the cooling fluid source over the flashlamp, the second cooling jacket is made of a material that is transparent to the optical output of the flashlamp.

7. A gain medium assembly for a laser system connectable to a cooling fluid source, comprising:

an elongated gain medium having an outer side surface and two opposing end faces;

an elongated insulating jacket disposed around the gain medium side surface;

an elongated cooling jacket disposed around the insulating jacket to define a cooling channel therebetween for guiding flowing cooling fluid from the cooling fluid source over the insulating jacket; and an elongated energy source for optically exciting and heating the gain medium, wherein the heat in the gain medium dissipates out through the outer side surface, through the insulating jacket and to the cooling fluid in the cooling channel, and wherein the gain medium is maintained at a temperature that is significantly higher than the temperature of the cooling fluid.

8. The gain medium assembly of claim 7, wherein the gain medium outer side surface forms a gap with an inner surface of the insulating jacket to trap essentially static cooling fluid therein.

9. The gain medium assembly of claim 7, wherein during operation the gain medium is maintained at a temperature that is at least 30° C. higher than the temperature of the cooling fluid.

10. The gain medium assembly of claim 7, wherein the gain medium outer side surface forms a gap with an inner surface of the insulating jacket, the gap having a width that is small enough to divert most of the flowing cooling water to the cooling channel while allowing some of the cooling fluid to fill the gap and form a layer of cooling fluid between the gain medium outer surface and the insulating jacket inner surface for even thermal contact therebetween.

11. The gain medium assembly of claim 10, wherein the energy source is a flashlamp disposed adjacent to the cooling jacket for optically exciting the gain medium, the insulating jacket and the cooling jacket are made of materials that are transparent to the optical output of the flashlamp.

12. The gain medium assembly of claim 11, further comprising:
   a second cooling jacket defining a second cooling channel surrounding the flashlamp for guiding flowing cooling fluid from the cooling fluid source over the flashlamp, the second cooling jacket is made of a material that is transparent to the optical output of the flashlamp.

13. The gain medium assembly of claim 12, wherein the cooling jackets are integrally formed together as a single composite cooling jacket.

14. The gain medium assembly of claim 13, further comprising:
   a pair of plates holding ends of the composite cooling jacket, one of the plates having an input port to deliver cooling fluid to the cooling channels, and the other of the plates having an output port for draining cooling fluid from the cooling channels.

15. The gain medium assembly of claim 13, further comprising:
   positioning pins extending from the plates to engage with and position the insulating tube.

16. A laser system connectable to a cooling fluid source, comprising:
   a plurality of laser cavities each having:
      a gain medium,
      a cooling jacket disposed around the gain medium for receiving cooling fluid from the cooling source, and
      an energy source for optically exciting and heating the gain medium, wherein the gain medium is cooled by the cooling fluid flowing through the cooling jacket; and
   one of the laser cavities including:
      an insulating jacket disposed between the gain medium and the cooling jacket to define a cooling channel between the insulating jacket and the cooling jacket for guiding flowing cooling fluid from the cooling fluid source over the insulating jacket, wherein the heat in the gain medium dissipates through the insulating jacket and to the cooling fluid in the cooling channel, and wherein the gain medium is maintained at a temperature that is significantly higher than the temperature of the cooling fluid.

17. The laser system of claim 16, wherein the gain medium in the one laser cavity has an outer side surface that forms a gap with an inner surface of the insulating jacket to trap essentially static cooling fluid therein.

18. The laser system of claim 16, wherein during operation the gain medium in the one laser cavity is maintained at a temperature that is at least 30° C. higher than the temperature of the cooling fluid.

19. The laser system of claim 16, wherein the gain medium in the one laser cavity has an outer side surface that forms a gap with an inner surface of the insulating jacket, the gap having a width that is small enough to divert most of the flowing cooling water to the cooling channel while allowing some of the cooling fluid to fill the gap and form a layer of cooling fluid between the gain medium outer surface and the insulating jacket inner surface for even thermal contact therebetween.

20. The laser system of claim 19, wherein the energy source in the one laser cavity is a flashlamp disposed adjacent to the cooling jacket for optically exciting the gain medium, the insulating jacket and the cooling jacket are made of materials that are transparent to the optical output of the flashlamp.

21. The laser system of claim 20, wherein the one laser cavity further comprises:
   a second cooling jacket defining a cooling channel surrounding the flashlamp for guiding flowing cooling fluid from the cooling fluid source over the flashlamp, the second cooling jacket is made of a material that is transparent to the optical output of the flashlamp.

22. The laser system claim 21, wherein the cooling jackets are integrally formed together as a single composite cooling jacket.

23. The gain medium assembly of claim 22, further comprising:
   a pair of plates that hold ends of the composite cooling jacket, one of the plates having an input port to deliver cooling fluid to the cooling channels, and the other of the plates having an output port for draining cooling fluid from the cooling channels.

24. The gain medium assembly of claim 22, further comprising: positioning pins extending from the plates to engage with and position the insulating tube.

\* \* \* \* \*